United States Patent
Robertson

(10) Patent No.: US 9,128,309 B1
(45) Date of Patent: Sep. 8, 2015

(54) PLURAL EAM DEVICE WITH OPTIMIZED WAVEGUIDE PROFILE

(75) Inventor: Stephen Robertson, Harleysville, PA (US)

(73) Assignee: Lockheed Martin Corporation, Bethesda, MD (US)

(*) Notice: Subject to any disclaimer, the term of this patent is extended or adjusted under 35 U.S.C. 154(b) by 933 days.

(21) Appl. No.: 13/247,974

(22) Filed: Sep. 28, 2011

Related U.S. Application Data

(60) Provisional application No. 61/387,652, filed on Sep. 29, 2010.

(51) Int. Cl.
*G02F 1/035* (2006.01)

(52) U.S. Cl.
CPC .................................... *G02F 1/035* (2013.01)

(58) Field of Classification Search
None
See application file for complete search history.

(56) References Cited

U.S. PATENT DOCUMENTS

| | | | | |
|---|---|---|---|---|
| 6,100,543 | A * | 8/2000 | Sakata | 257/21 |
| 6,359,720 | B1 * | 3/2002 | Yamada | 359/245 |
| 6,804,421 | B2 * | 10/2004 | Bond et al. | 385/2 |
| 6,862,376 | B2 * | 3/2005 | Bond et al. | 385/1 |
| 6,914,706 | B2 * | 7/2005 | Ishimura | 359/245 |
| 7,636,501 | B2 * | 12/2009 | Doerr et al. | 385/3 |
| 8,098,965 | B1 * | 1/2012 | Baehr-Jones et al. | 385/2 |
| 2003/0095737 | A1 * | 5/2003 | Welch et al. | 385/14 |
| 2003/0142895 | A1 * | 7/2003 | Bond et al. | 385/2 |
| 2006/0126987 | A1 * | 6/2006 | Kang et al. | 385/2 |

* cited by examiner

*Primary Examiner* — Tina Wong
(74) *Attorney, Agent, or Firm* — McDermott Will & Emery LLP

(57) ABSTRACT

An electroabsorption device includes an optical waveguide having an input portion with a first optical confinement characteristic. A first electroabsorption region is formed along the optical waveguide having a first optimized optical mode confinement characteristic. A second electroabsorption region is formed along the optical waveguide having a second optimized optical mode confinement characteristic independent of the first optimized optical mode confinement characteristic. The first optimized optical mode confinement characteristic is defined independently of the second optimized optical mode confinement characteristic.

12 Claims, 2 Drawing Sheets

PLURAL EAM DEVICE WITH OPTIMIZED WAVEGUIDE PROFILE

CROSS-REFERENCE TO RELATED APPLICATIONS

The present application claims the benefit of U.S. Provisional Patent Application Ser. No. 61/387,652, entitled "PLURAL EAM DEVICE WITH OPTIMIZED WAVEGUIDE PROFILE," filed on Sep. 29, 2010, which is hereby incorporated by reference in its entirety for all purposes.

STATEMENT REGARDING FEDERALLY SPONSORED RESEARCH OR DEVELOPMENT

Not applicable.

FIELD OF THE INVENTION

The present invention relates to semiconductor optoelectronic components. In particular, the present invention relates to coupling two or more electroabsorption modulators along a waveguide to maximize efficiency and performance thereof.

BACKGROUND

Electroabsorptive modulators (EAM) are known to be used for modulating RF signals. There are many known benefits associated with optical modulation of RF signals including very small size, higher operating frequencies, immunity to electromagnetic interference, and relatively wide signal bandwidth.

An EAM is typically a semiconductor waveguide device in which the absorption region (also known as the absorption layer) also serves as an optical waveguiding layer. As is known in the art, an electric field applied across the waveguide causes a change in the optical absorption of the device, which in turn causes the intensity of the light passing through the waveguide to be modulated. By applying an RF signal to the device, the intensity modulation of the input light signal will vary in accordance with the variation of the RF signals.

However, in order to maximize the performance of an optical system, it is necessary to increase the optical power delivered to the detector in the system. One method of maximizing system performance is to minimize optical insertion losses in the system. In particular, it is desirable to minimize optical insertion losses, also known as coupling losses, between a laser transmitter and the waveguide portion of the EAM. Another method of maximizing system performance is to increase the output of the laser transmitter to offset any coupling losses. However, EAMs suffer from a charge screening effect that minimizes the modulation efficiency of EAMs at high optical insertion power. As a result, optical power levels at the input of an EAM must be limited to values below the saturation level of the optical element at high optical insertion power.

It is also known to design EAMs using optical couplers, for example peripheral coupled waveguides, to minimize electroabsorption saturation by controlling an amount of optical power absorbed in the waveguide from the laser transmitter through an input facet. It is further known to reduce an optical confinement factor in an electroabsorption region of the EAM to prevent saturation of the EAM. In one method, the electroabsorption region of the EAM having a reduced optical confinement factor is placed in optical communication with a laser transmitter to limit the optical power absorbed by the EAM. However, if the optical confinement factor is constant along the waveguide portion of the EAM, an input region of the waveguide absorbs the most optical power and tends to saturate first at high optical input powers, thereby reducing the modulation efficiency. At very high optical input power, the input region of the waveguide of the EAM may undergo catastrophic failure due to heat produced by sustained generation of high photocurrent.

A peripheral coupled waveguide EAM is disclosed in U.S. Pat. No. 7,167,605, incorporated herein by reference in its entirety, wherein an electroabsorption material is placed within an evanescent tail of an optical wave guided within an optical waveguide. A modulation voltage is applied to the electroabsorption material within the evanescent tail of the optical wave to modulate the optical wave. U.S. Pat. No. 7,167,605 further discloses optimizing an optical confinement factor to maximize performance of the EAM.

An optical waveguide taper has been shown to improve the performance of a single modulator by changing the confinement factor of the waveguide as a function of position along the length of the waveguide. For example, combining a reduced optical confinement factor at an input region of the waveguide with an increasing optical mode confinement factor in the center of the waveguide can improve the optical saturation power of the EAM. However, the optical confinement factor must be reduced at the exit of the waveguide portion of the EAM if the EAM is to couple to an external photonic component, for example on another EAM chip.

Certain applications, such as a photonics-based satellite communications front end for example, require two or more modulators to perform needed frequency translation functionality. However, the process of coupling optical signals from a laser chip to a modulator chip and then to a second modulator chip produces excess coupling losses that minimize the effectiveness of the system. It is therefore desirable to develop an EAM device and method to optimize the coupling and performance of multiple EAMs independently of the optical input.

SUMMARY

Concordant and consistent with the present invention, a device and method to optimize the coupling and performance of a plurality of EAMs independently of the optical input has been discovered.

The device includes a plurality of EAMs which share and are interconnected by an integrated optical waveguide for guiding an optical wave of interest. A first electroabsorption modulator is formed along the optical waveguide having a first optimized optical mode confinement characteristic for a first modulation of the optical wave of interest. A second electroabsorption modulator is formed along the optical waveguide having a second optimized optical mode confinement characteristic independent of the first optimized optical mode confinement characteristic for a second modulation of the optical wave of interest. The optical mode confinement characteristic of each EAM is optimized by incorporating one or more optical waveguide tapers into the design of the device.

In one embodiment, the first optimized optical mode confinement characteristic maximizes the modulation performance of the first electroabsorption region. In another embodiment, the second optimized optical mode confinement characteristic maximizes the modulation performance of the second electroabsorption region.

A method for optimizing the coupling and performance of a plurality of EAMs is also disclosed. According to the method, an input portion of an optical waveguide is tapered to couple an optical wave into the optical waveguide with a high coupling efficiency. The optical wave is guided within the waveguide to a first electroabsorption region having a first optimized optical mode confinement characteristic. A first modulation voltage is applied to a first electroabsorptive material in the first electroabsorption region to obtain a first optical modulation of the optical wave. The modulated optical wave is guided within the waveguide to a second electroabsorption region having a second optimized optical mode confinement characteristic. A second modulation voltage is applied to a second electroabsorptive material in the second electroabsorption region to obtain a second optical modulation of the optical wave.

An electroabsorption device adapted to be optically coupled to an optical input device is further disclosed. The electroabsorption device comprises means for guiding an optical wave, wherein an input portion has a first optical confinement characteristic. The electroabsorption device also comprises means for a first electroabsorption modulation formed along the means for guiding the optical wave, the means for the first electroabsorption modulation having a first optimized optical mode confinement characteristic; and means for a second electroabsorption modulation formed along the means for guiding the optical wave, the means for the second electroabsorption modulation having a second optimized optical mode confinement characteristic independent of the first optimized optical mode confinement characteristic.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding.

Figure 1:
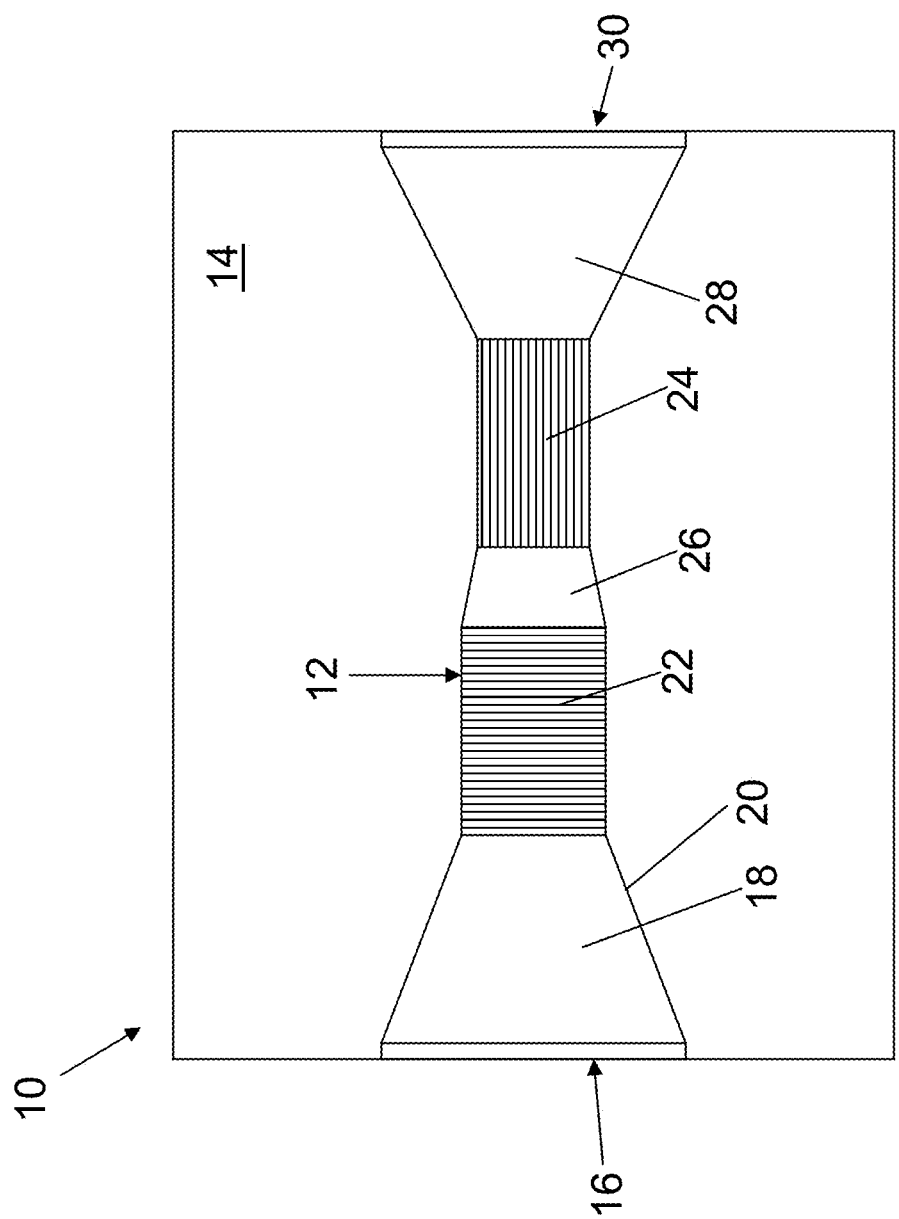
FIG. 1 illustrates the top view of a first example of an electroabsorption device. The electroabsorption device comprises an optical waveguide for guiding an optical wave of interest and two electroabsorption modulators formed in series along the optical waveguide, wherein the first electroabsorption modulator has a first optimized optical mode confinement characteristic and the second electroabsorption modulator has a second optimized optical mode confinement characteristic that is independent of the first optimized optical mode confinement characteristic.

FIG. 1 illustrates a first example of an electroabsorptive device 10 according to the present invention. It is understood that the electroabsorptive device 10 is formed as a semiconductor device using conventionally known methods and processes. In one embodiment, the electroabsorptive device is formed as a n-p semiconductor having waveguide layers and active layers including a predetermined number of quantum wells (not shown). As a non-limiting example, the electroabsorptive device 10 may be formed as disclosed in U.S. Pat. No. 7,167,605, incorporated herein by reference in its entirety.

According to the present invention, a waveguide 12 is formed on a substrate 14 from one or more layers of semiconductor material to receive an optical wave. The waveguide 12 is formed with an input portion 16 adapted to receive optical signals, such as from a laser transmitter. The input portion 16 may be formed as any optical coupler. The input portion 16 is formed having a first predetermined optical confinement factor to minimize electroabsorption saturation by controlling an amount of optical power absorbed in the waveguide from a laser transmitter through the input portion 16. In one embodiment, the waveguide input portion 16 transitions to a tapered portion 18 that reduces a cross-section of the waveguide 12, which has the effect of increasing an optical confinement characteristic of that portion of the waveguide 12. The angled wall 20 of the tapered portion 18 may have any desired slope and length, and may reduce the cross section of the waveguide 12 to any desired cross-section. A plurality of such tapers may be used along the length of the device to optimize the cross-section of the waveguide. In this way, a first electroabsorption region 22 is formed along the optical waveguide 12 to have an optimized optical confinement characteristic. Additionally, a variety of design parameters of the waveguide 12 may be modified in the first electroabsorption region 22 to obtain a first optimized optical mode confinement characteristic of the waveguide 12 in the first electroabsorption region 22. As non-limiting examples, a physical or effective thickness of a first electroabsorptive material (not shown) in the first electroabsorption region 22, a modulation voltage amplitude or frequency applied across the electroabsorptive material, an optical confinement factor, impedance matching, propagation loss or the like may affect the first optimized optical mode confinement characteristic of the waveguide 12 in the first electroabsorption region 22. It is understood that the first electroabsorption region 22 may have any desired shape and characteristics, and may be formed using any conventionally known materials and methods. The optical wave is modulated within the first electroabsorption region 22, and exits the first electroabsorption region as a first modulated optical wave.

According to the present invention, rather than reducing the optical confinement factor of the waveguide 12 after the first electroabsorption region 22 to allow optical coupling and transmission of the first modulated optical wave to a second optical device, a second electroabsorption region 24 is formed along the length of the waveguide 12. A transitional region 26 may optionally be interposed between the first electroabsorption region 22 and the second electroabsorption region 24 to allow for independent adjustment of an optical confinement characteristic of the waveguide 12 to obtain a second optimized optical mode confinement characteristic in the second electroabsorption region 24 in the waveguide 12 to optimize the performance of the second electroabsorption region 24. It is understood that the transitional region 26 may include adjustments to the cross section of the waveguide 12, or may include structural or material transitions, or both. As non-limiting examples, a physical or effective thickness of a second electroabsorptive material (not shown) in the second electroabsorption region 24, a modulation voltage amplitude or frequency applied across the electroabsorptive material, an optical confinement factor, impedance matching, propagation loss or the like may affect the second optimized optical mode confinement characteristic of the waveguide 12 in the second electroabsorption region 24. Optionally, if the first electroabsorption region 22 and the second electroabsorption region 24 require the same optical confinement factor, the transitional region 26 may be omitted. For illustration purposes in the drawing, the transitional region 26 is depicted as a reducing tapered region to a reduced cross-section of the waveguide 12 at the second electroabsorption region 24. After the second electroabsorption region 24, the waveguide 12 is shown to have an increasing cross-sectional taper 28 terminating in a coupling portion 30 for coupling to additional elements within the optical system. While only two electroabsorption regions 22 and 24 are shown in the drawing, it is understood that additional electroabsorption regions may be utilized in the same optical waveguide as long as the optical density and power is sufficient for optimized signal processing.

According to the present invention, the optical waveguide 12 can include a first optimized optical mode confinement characteristic in the first electroabsorption region 22, and then, since the second electroabsorption region 24 is on the same semiconductor substrate 14 as the first electroabsorption region 22, the first optical confinement factor can remain at an optimum level all the way through the length of the first electroabsorption region 22, and into the second electroabsorption region 24. Additionally, the waveguide 12 may be formed with a second optical mode confinement characteristic in the second electroabsorption region 24. The second optimized optical mode confinement characteristic may be optimized independent of any external optical coupling requirements since a single optical waveguide 12 is used to transfer optical signals from the first electroabsorption region 22 to the second electroabsorption region 24. Additionally, the second optimized optical mode confinement characteristic may be optimized wholly independently of the first optical mode confinement characteristic. Thus, the optical and electrical mode profiles of each electroabsorption modulator, corresponding to the electroabsorption regions 22 and 24, will be optimized independently so as to produce maximum system performance. The present disclosure also eliminates an optical coupling between the first electroabsorption region 22 and the second electroabsorption region 24, thereby minimizing the optical power insertion losses along the length of the waveguide 12 while maximizing the modulation of the input signal.

A method for optimizing the coupling and performance of a plurality of EAMs is also included in the present disclosure. An input portion 16 of an optical waveguide 12 is first tapered to couple an optical wave into the optical waveguide with a high coupling efficiency. The optical wave is guided within the waveguide 12 to a first electroabsorption region 22 having a first optimized optical mode confinement characteristic. A first modulation voltage is applied to a first electroabsorptive material in the first electroabsorption region 22 to obtain a first optical modulation of the optical wave. Upon exiting the first electroabsorption region 22, the modulated optical wave is guided within the waveguide 12 to a second electroabsorption region 24 having a second optimized optical mode confinement characteristic. A second modulation voltage is applied to a second electroabsorptive material in the second electroabsorption region 24 to obtain a second optical modulation of the optical wave. The first optical mode confinement factor may be optimized to maximize the performance of the first electroabsorption region 22. The second optical mode confinement factor may be optimized independently of the first optical mode confinement factor to maximize the performance of the second electroabsorption region 24 if desired.

Figure 2:
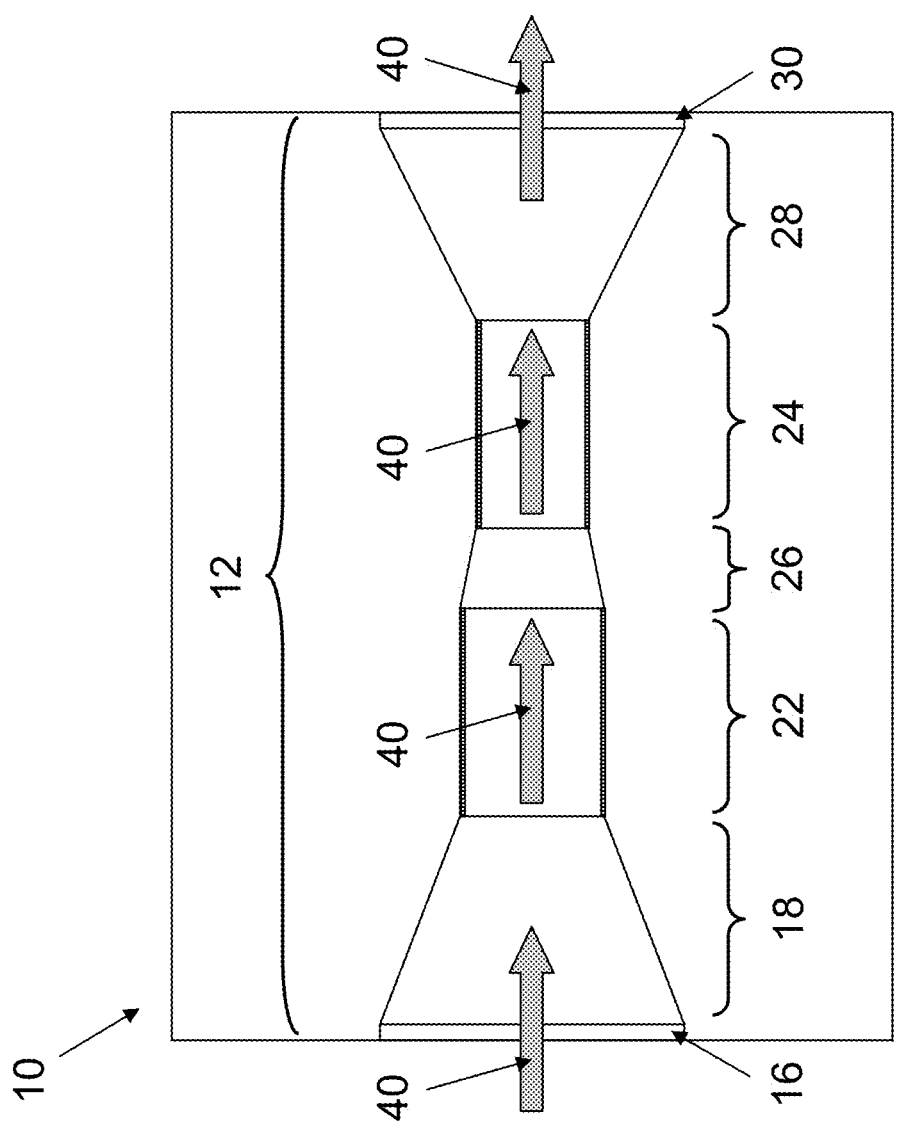
FIG. 2 illustrates a first example of an optical wave moving through the electroabsorption device shown in FIG. 1.

FIG. 2 illustrates a first example of an optical wave moving through the electroabsorption device shown in FIG. 1. For example, an optical wave 40 enters the electroabsorption device 10 via the input portion 16, which is adapted to receive optical signals, such as from a laser transmitter. The optical wave 40 then passes through these portions of waveguide 12: the tapered portion 18, the first electroabsorption region 22, the transitional region 26, the second electroabsorption region 24, and finally the tapered portion 28. From the tapered portion 28, the optical wave 40 exits the electroabsorption device 10 via the output portion 30, which is adapted to transmit optical signals to additional elements within an optical system. Modulation of the optical wave 40 occurs within both the first electroabsorption region 22 and the second electroabsorption region 24.

Thus, the present disclosure allows for construction of a photonics-based satellite communications front end that requires two modulators to perform needed frequency translation functionality on a single waveguide device without experiencing coupling losses between the two modulators. Further, each of the modulators may be independently optimized to improve performance and to reduce power loss. Previous methods of addressing this problem utilize two lithium niobate Mach-Zhender Interfereometer (MZI) modulators. However, the MZI modulators may not be independently optimized to produce high performance links. Additionally, MZI modulators are 3 to 4 times larger than equivalent EAMs, which prevents multiple MZI modulators from being integrated within the same semiconductor device. In addition, EAMs are smaller in size, weight, and power consumption than other types of modulators, and this has particular advantages where payload size is a driving concern, such as satellite or UAV applications for example.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While certain representative embodiments and details have been shown for purposes of illustrating the invention, it will be apparent to those skilled in the art that various changes may be made without departing from the scope of the disclosure, which is further described in the following appended claims.

What is claimed is the following:

1. An electroabsorption device adapted to be optically coupled to an optical input device, the electroabsorption device comprising:
    an optical waveguide for guiding an optical wave of interest, the optical waveguide having an input portion with a first optical confinement characteristic;
    a first electroabsorption modulator formed along the optical waveguide, the first electroabsorption modulator having a first optimized optical mode confinement characteristic, the first electroabsorption modulator configured to receive a first modulation voltage; and
    a second electroabsorption modulator formed along the optical waveguide, the second electroabsorption modulator having a second optimized optical mode confinement characteristic independent of the first optimized optical mode confinement characteristic, the second electroabsorption modulator configured to receive a second modulation voltage, the second modulation voltage independent of the first modulation voltage.

2. The electroabsorption device of claim 1, wherein the first optimized optical mode confinement characteristic maximizes the performance of the first electroabsorption modulator.

3. The electroabsorption device of claim 2, wherein the second optimized optical mode confinement characteristic maximizes the performance of the second electroabsorption modulator.

4. The electroabsorption device of claim 2, wherein the first optimized optical mode confinement characteristic is optimized by incorporating at least one taper into a first portion of the optical waveguide that is situated within the first electroabsorption modulator.

5. The electroabsorption device of claim 4, wherein the at least one taper increases the first optimized optical mode confinement characteristic by reducing a cross section of the first portion of the optical waveguide that is situated within the first electroabsorption modulator.

6. The electroabsorption device of claim 2, wherein the first optimized optical mode confinement characteristic is optimized by incorporating at least one of the following:
    a physical or effective thickness of a first electroabsorptive material in the first electroabsorption modulator, a modulation voltage amplitude or frequency applied across the electroabsorptive modulator, an optical confinement factor, impedance matching, and propagation loss.

7. The electroabsorption device of claim 3, wherein the second optimized optical mode confinement characteristic is optimized by incorporating at least one taper into a second portion of the optical waveguide that is situated within the second electroabsorption modulator.

8. The electroabsorption device of claim 7, wherein the at least one taper increases the second optimized optical mode confinement characteristic by reducing a cross section of the second portion of the optical waveguide that is situated within the second electroabsorption modulator.

9. The electroabsorption device of claim 3, wherein the second optimized optical mode confinement characteristic is optimized by incorporating at least one of the following:
    a physical or effective thickness of a second electroabsorptive material in the second electroabsorption modulator, a modulation voltage amplitude or frequency applied across the electroabsorptive modulator, an optical confinement factor, impedance matching, and propagation loss.

10. An electroabsorption device adapted to be optically coupled to an optical input device, the electroabsorption device comprising:
    means for guiding an optical wave, wherein an input portion has a first optical confinement characteristic;
    means for a first electroabsorption modulation formed along the means for guiding the optical wave, the means for the first electroabsorption modulation having a first optimized optical mode confinement characteristic, the means for the first electroabsorption modulation configured to receive a first modulation voltage; and
    means for a second electroabsorption modulation formed along the means for guiding the optical wave, the means for the second electroabsorption modulation having a second optimized optical mode confinement characteristic independent of the first optimized optical mode confinement characteristic, the means for the second electroabsorption modulation configured to receive a second modulation voltage, the second modulation voltage independent of the first modulation voltage.

11. The electroabsorption device of claim 10, wherein the first optimized optical mode confinement characteristic maximizes the performance of the means for the first electroabsorption modulation.

12. The electroabsorption device of claim 11, wherein the second optimized optical mode confinement characteristic maximizes the performance of the means for the second electroabsorption modulation.

* * * * *